United States Patent
Chen et al.

(10) Patent No.: US 7,043,740 B2
(45) Date of Patent: May 9, 2006

(54) OPTICAL DISC DRIVE WHICH CAN FIRMLY FIX ITS TRAY MODULE WITHIN ITS HOUSING

(75) Inventors: Ming-Yu Chen, Taipei (TW); Chih-Liang Chen, Taipei (TW); Chien-Yueh Chen, Taipei (TW)

(73) Assignee: Aopen Inc., Taipei Hsien (TW)

( * ) Notice: Subject to any disclaimer, the term of this patent is extended or adjusted under 35 U.S.C. 154(b) by 295 days.

(21) Appl. No.: 10/707,584

(22) Filed: Dec. 22, 2003

(65) Prior Publication Data

US 2005/0071858 A1   Mar. 31, 2005

(30) Foreign Application Priority Data

Sep. 29, 2003 (TW) .............................. 92126899 A

(51) Int. Cl.
*G11B 17/04* (2006.01)

(52) U.S. Cl. .................................................... 720/610
(58) Field of Classification Search ................. 720/610
See application file for complete search history.

(56) References Cited

U.S. PATENT DOCUMENTS

| 5,563,865 | A | * | 10/1996 | Wheeler ..................... 720/608 |
| 5,585,978 | A | * | 12/1996 | Rottenburg et al. .......... 360/85 |
| 6,181,663 | B1 | * | 1/2001 | Kakuta et al. .............. 720/610 |
| 6,246,540 | B1 | * | 6/2001 | Kabasawa ................ 360/99.06 |
| 6,665,253 | B1 | * | 12/2003 | Lan et al. .................... 720/659 |
| 6,775,093 | B1 | * | 8/2004 | Smith et al. .................. 360/92 |
| 2001/0055178 | A1 | * | 12/2001 | Stabile et al. ................ 360/94 |
| 2002/0018426 | A1 | * | 2/2002 | Minase ...................... 369/75.2 |
| 2003/0043720 | A1 | * | 3/2003 | Fujisawa .................... 369/75.2 |
| 2004/0205787 | A1 | * | 10/2004 | Wu ............................ 720/610 |

FOREIGN PATENT DOCUMENTS

| JP | 06068572 A | * | 3/1994 |
| JP | 2003331499 A | * | 11/2003 |
| JP | 2004185762 A | * | 7/2004 |
| JP | 2004303289 A | * | 10/2004 |

* cited by examiner

*Primary Examiner*—William Korzuch
*Assistant Examiner*—Matthew G. Kayrish
(74) *Attorney, Agent, or Firm*—Winston Hsu

(57) ABSTRACT

An optical disc drive includes a housing, a positioning shaft fixed on the housing, and a tray module. The tray module includes a tray installed inside the housing with the ability to slide, a solenoid fixed on the tray for providing magnetic force, a latch installed beside the solenoid moving in response to changes in magnetic force, a push pod fixed on the tray in a rotatable manner with one end connected to the latch and the other end forming a slot, a hook rotatably fixed on the tray with one end for engaging the positioning shaft and the other end connected to the push pod, a torsion spring fixed on the pivot of the push pod, and a compression spring installed in a track of the housing. One end of the compression spring is fixed in the slot of the push pod.

5 Claims, 21 Drawing Sheets

OPTICAL DISC DRIVE WHICH CAN FIRMLY FIX ITS TRAY MODULE WITHIN ITS HOUSING

BACKGROUND OF INVENTION

1. Field of the Invention

The present invention relates to an optical disc drive, and more specifically, to an optical disc drive which fixes the tray module within its housing.

2. Description of the Prior Art

In general, the tray-in and tray-out modules of the tray module in a thin optical disc drive are operated by a dc motor or suction solenoid. Usually, the method used by the dc motor collocates the gear module with either the light sensor or the limitation switch. The dc motor mechanism is quite complete, so the cost cannot be reduced.

In the method used by a suction solenoid, the volume of the suction solenoid mechanism is quite large. A consequence of the large size is that a suction solenoid mechanism may not be employed in an optical disc drive due to limited space in the optical disc drive unless drastic changes are made to the appearance of the product. Additionally, when the suction solenoid is not supplied with the power, the elasticity of the spring on the solenoid does not easily hold the tray-in module in a stable position. The following describes an optical disc drive that uses a suction solenoid.

Please refer FIG. 1–FIG. 5. FIG. 1 is a schematic diagram of the tray module 14 of the optical disc drive 10 that is in the tray-in location FIG. 2 is a schematic diagram of the tray module 14 of the optical disc drive 10 that is in the completely tray-out location. FIG. 3 is a schematic diagram of the tray-out module 15 of the optical disc drive 10 in FIG. 1. FIG. 4 is a location diagram of each component when the tray module 14 of the optical disc drive 10 in FIG. 1 is in the tray-in location. FIG. 5 is a location diagram of the tray-in module 21 of optical disc drive 10 in FIG. 1 that is in the tray-out location.

The optical disc drive 10 comprises a housing 12, a tray module 14 comprising a tray 16, a tray-out module 15 set on the tray 16 for pushing the tray module 14 out of the housing 12 with respect to the bottom of the housing 12, and a tray-in module set 21 on the tray 16 for locking the tray module 14 within the housing. The tray-out module 15 comprises a pusher 18 movably set on the tray 16, an extension spring 20 with one end fixed on the tray 16 and the other end fixed on the pusher 18. The tray-in module 21 comprises a solenoid 22 fixed on the tray 16, a shaft 24 fixed on the front end of the solenoid 22, a solenoid spring 26 set on the shaft 24, a hook 28 set on the front end via the shaft 24, and a positioning point 29 set on the tray 16.

Please refer to FIG. 3 and FIG. 4. When the tray module 14 of the optical disc drive 10 is in the tray-in location, the extension spring 20 is compressed according to how far tray 16 is within the housing 12. During that time, the extension spring is capable of pushing the tray module 14 out of the housing 12. When the solenoid 22 is not supplied with power, the solenoid spring 26 pushes the hook 28 to lock onto the positioning point 29 thereby preventing the pusher 18 from pushing the tray module 14 out of the housing 12.

Please refer to FIG. 1, FIG. 3, and FIG. 5. The tray-out process is operated via the key 27 on the panel of the optical disc drive 10. When the key 27 is pressed, the optical disc drive 10 sends a control signal to a CPU to notify the CPU; then the CPU sends another control signal to supply the solenoid 22 with power. When the solenoid is supplied with power, the solenoid 22 generates a difference in magnetic force to attract the shaft 24. The magnetic force of solenoid 22 is larger than the thrust of the solenoid spring 26, so the hook 28 will depart from the positioning point 29. When the hook 28 departs from the positioning point 29, the pusher 18 pushes the tray module 14 out of the housing 12 15–25 mm.

However, when the suction solenoid as shown in FIG. 1 is not supplied with power, the pushing force from the solenoid spring 26 is not enough to hold the tray-in module. The hook 28 and the positioning point 29 may be separated by an external force, causing the tray module 14 to come out of the housing 12.

SUMMARY OF INVENTION

It is therefore a primary objective of the claimed invention to provide an optical disc drive that is stably capable of fixing tray module within the housing.

According to the claimed invention, an optical disc drive comprises a housing having at least one track, a position shaft fixed on the housing, and a tray module. The tray module comprises a tray installed within the housing in with the ability to slide along the track, a solenoid fixed on the tray for providing a magnetic force, a latch installed beside the solenoid for moving according to changes in the magnetic force, a push rod fixed on the tray and able to rotate with respect to a pivot with one end of the push rod connected to the latch and the other end forming a slot, a hook fixed on the tray with one end for engaging the positioning shaft and another end connected to the push rod, a torsion spring fixed on the pivot of the push rod, and a compression spring installed on the tray and having one end fixed in the slot of the push rod.

DETAILED DESCRIPTION

Figure 1:
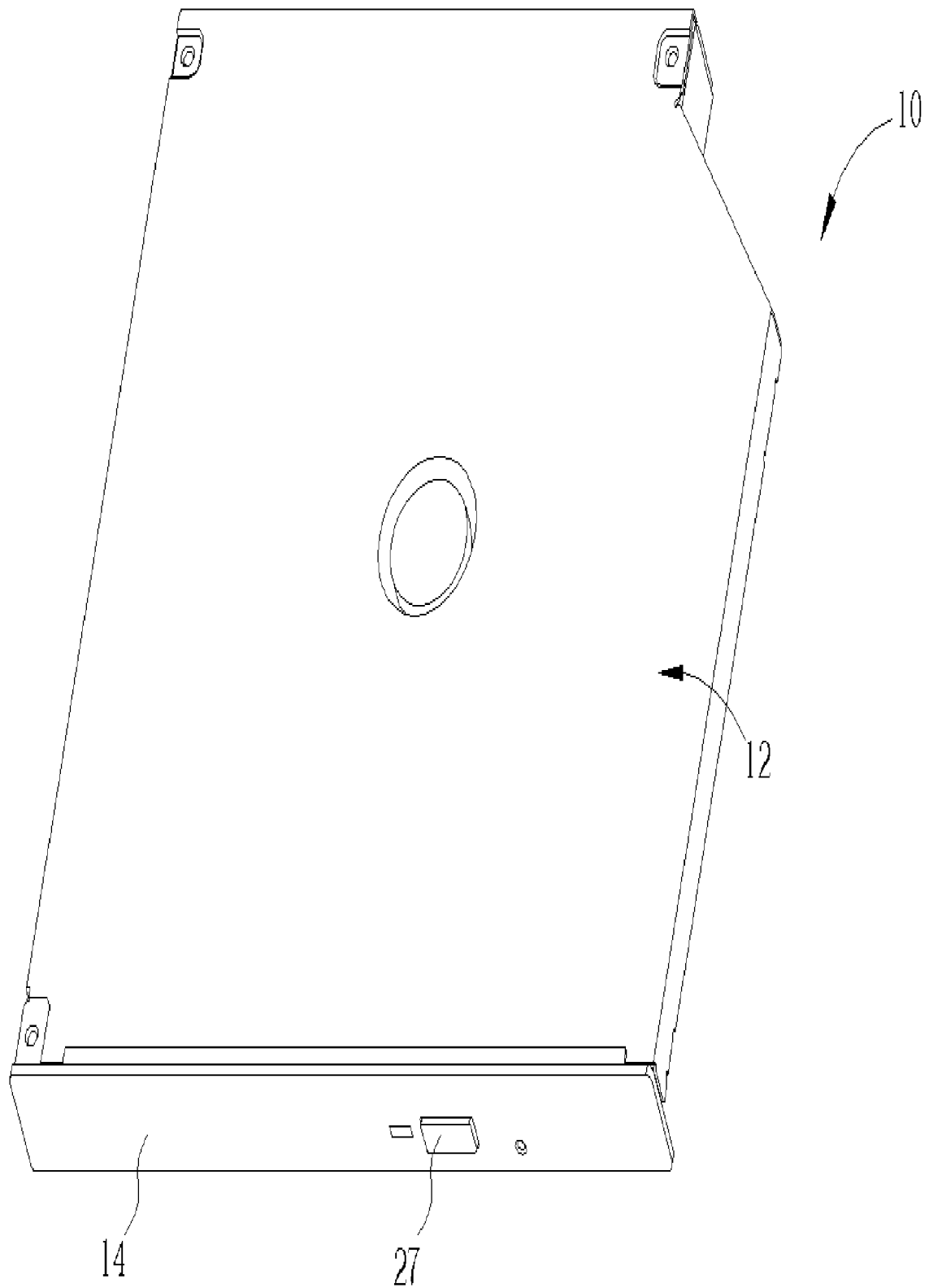
FIG. 1 is a schematic diagram of an optical disc drive when a tray module is in a tray-in location according to the prior art.
Figure 2:
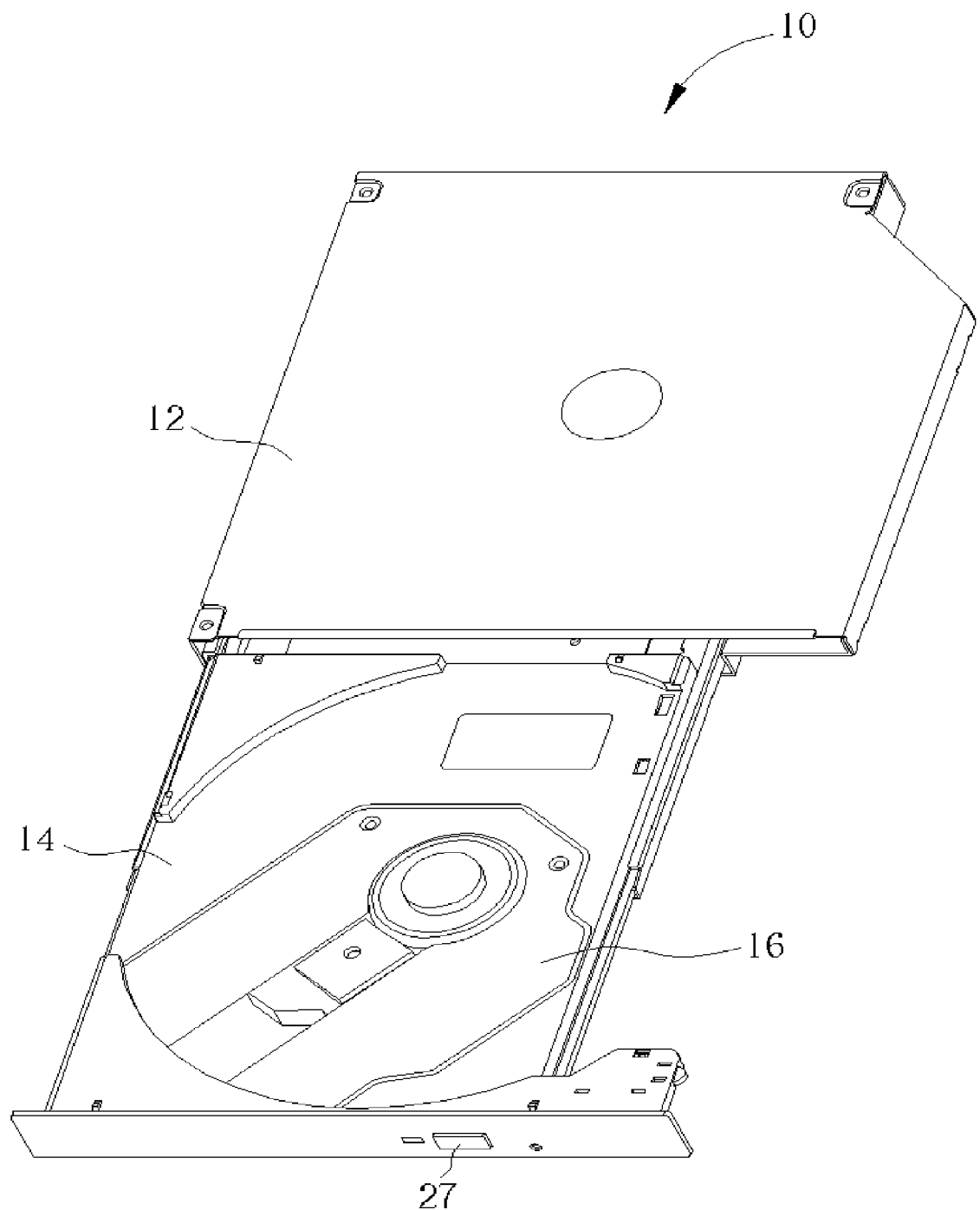
FIG. 2 is a schematic diagram of the optical disc drive in FIG. 1 when the tray module is in a tray-out location.
Figure 3:
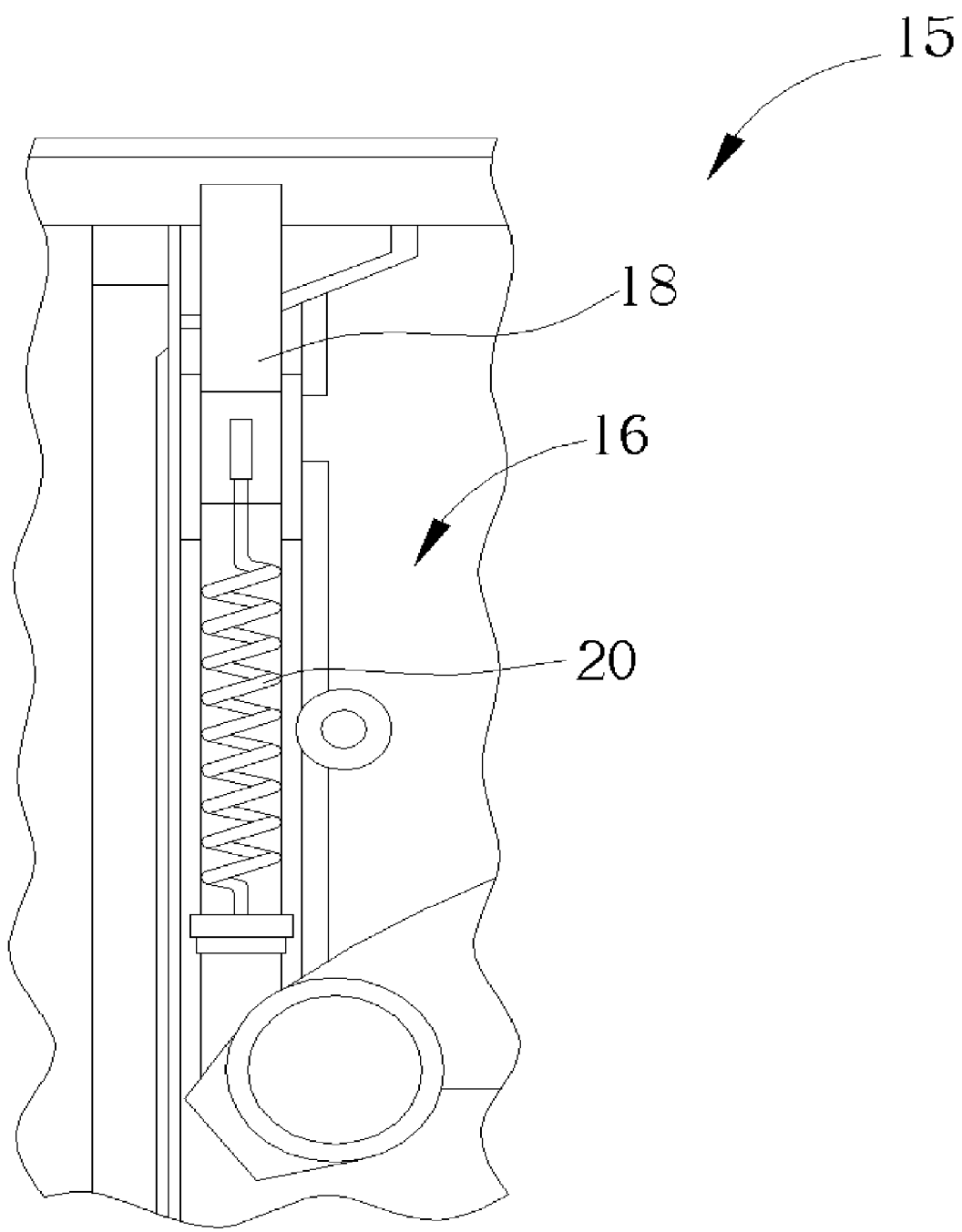
FIG. 3 is a schematic diagram of the tray module of the optical disc drive in FIG. 1.
Figure 4:
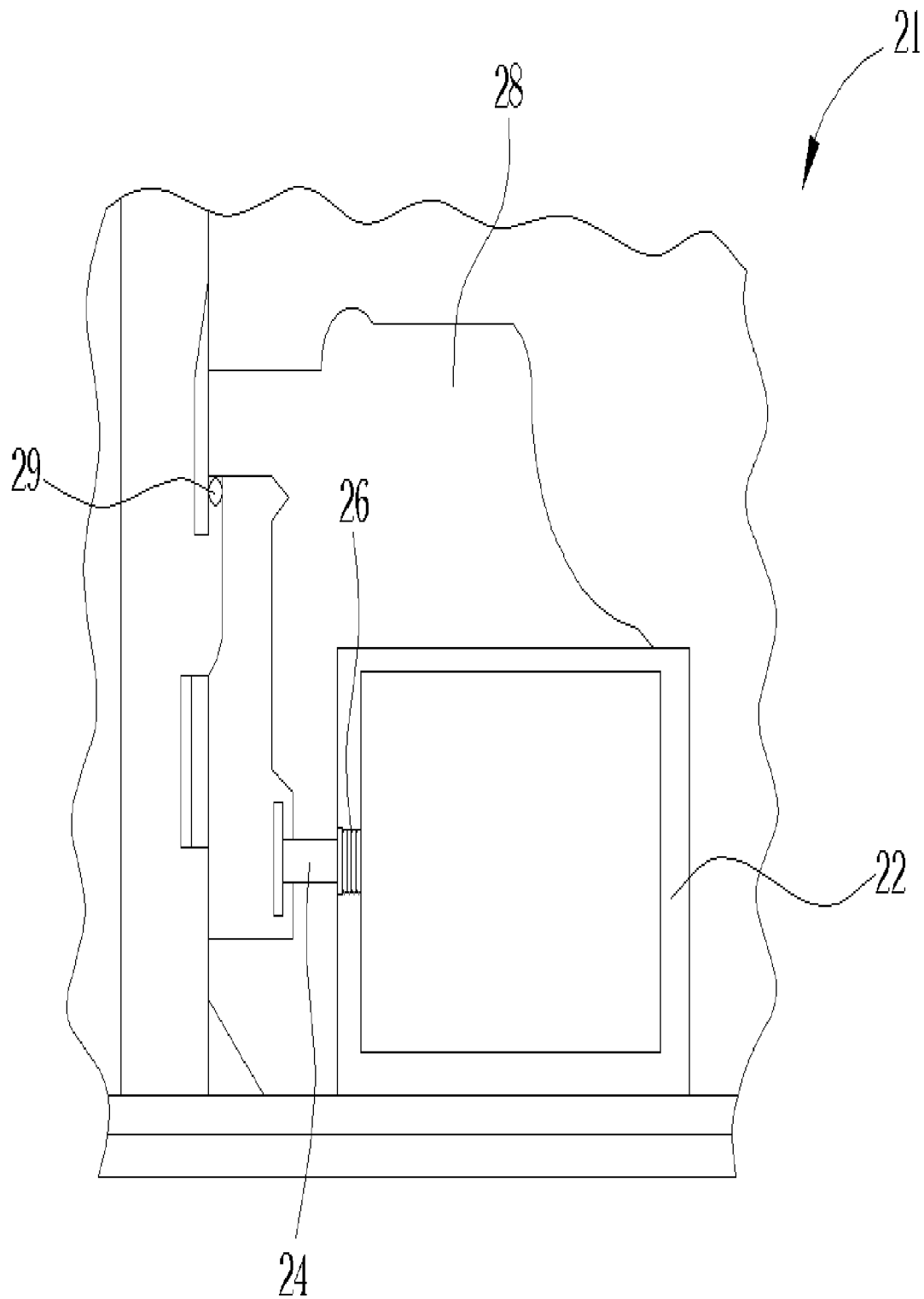
FIG. 4 is a schematic diagram of the optical disc drive in FIG. 1 when the tray module is in tray-in location.
Figure 5:
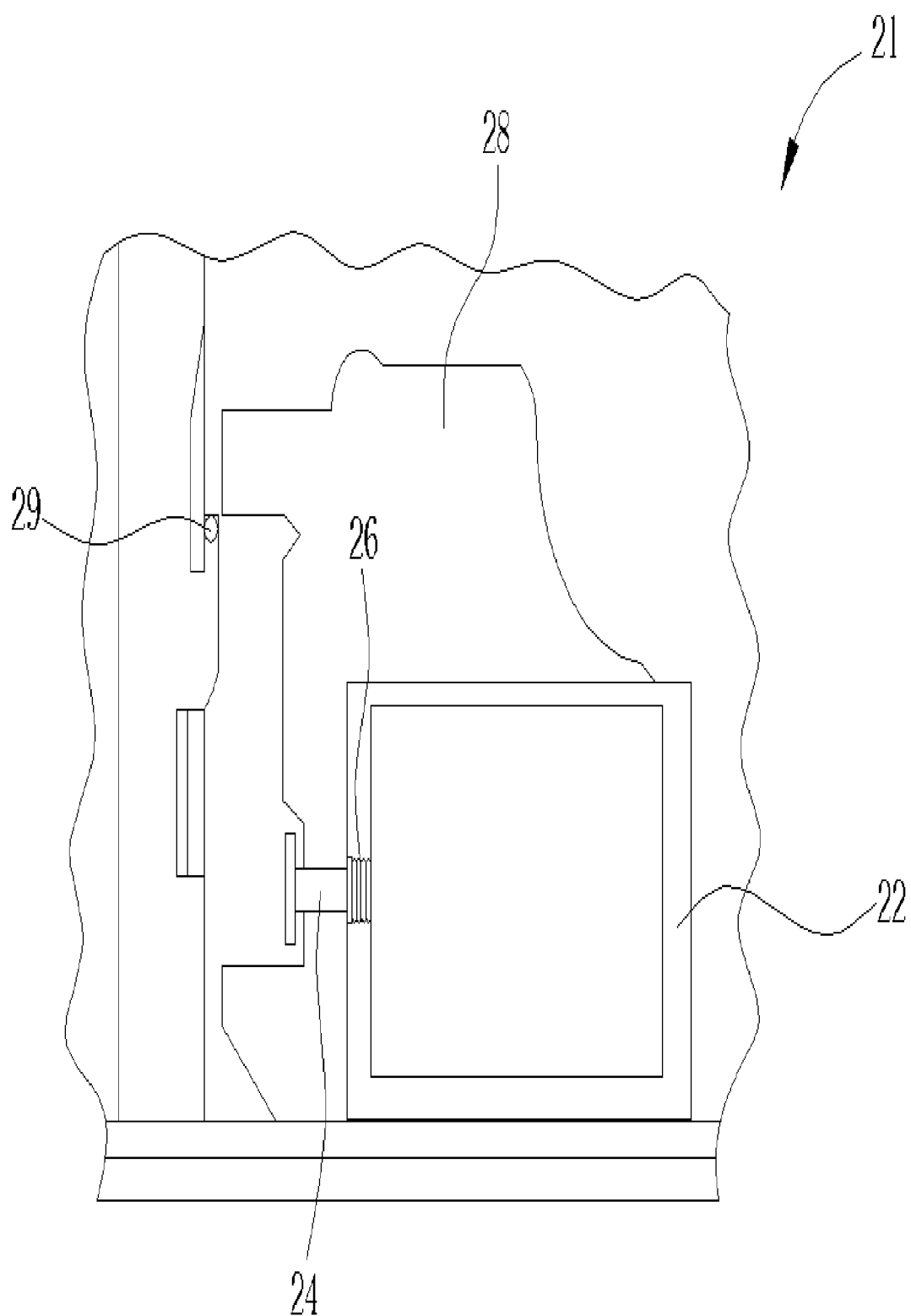
FIG. 5 is a schematic diagram of the optical disc drive in FIG. 1 when the tray module is in tray-out location.
Figure 6:
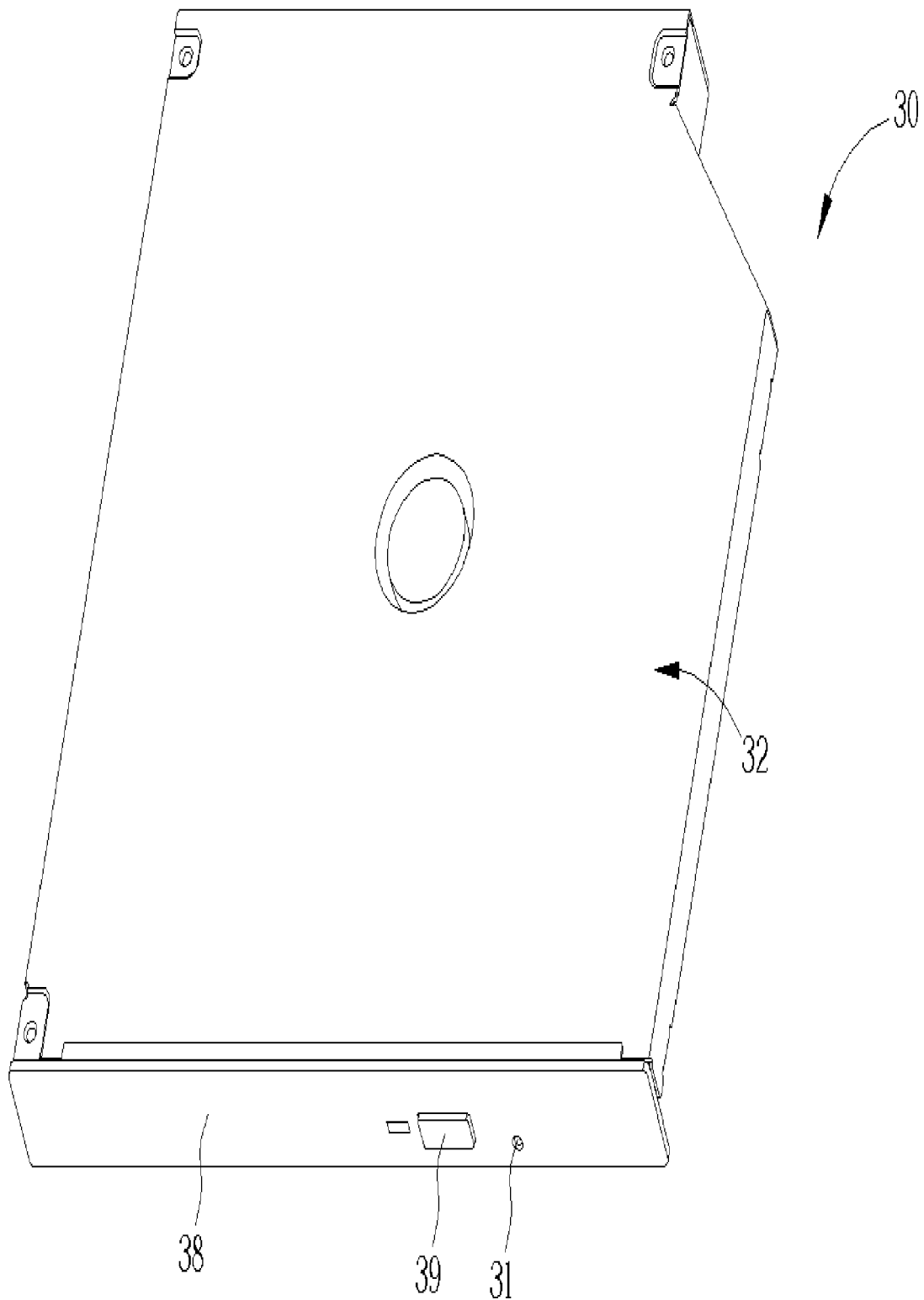
FIG. 6 is a schematic diagram of an optical disc drive according to the present invention when a tray module is in the tray-in location.
Figure 7:
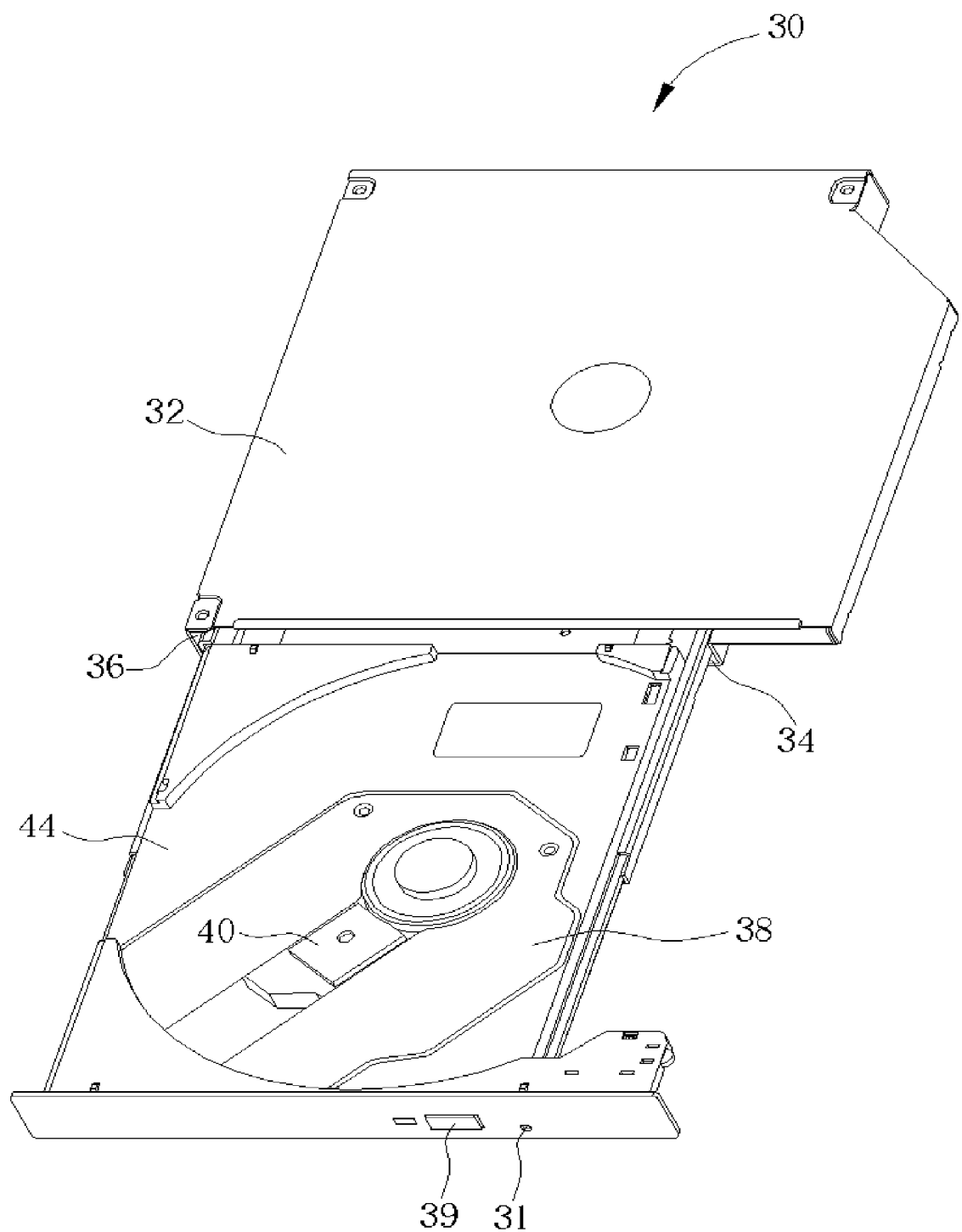
FIG. 7 is a schematic diagram of the optical disc drive in FIG. 6 when the tray module is in complete tray-out location.
Figure 8:
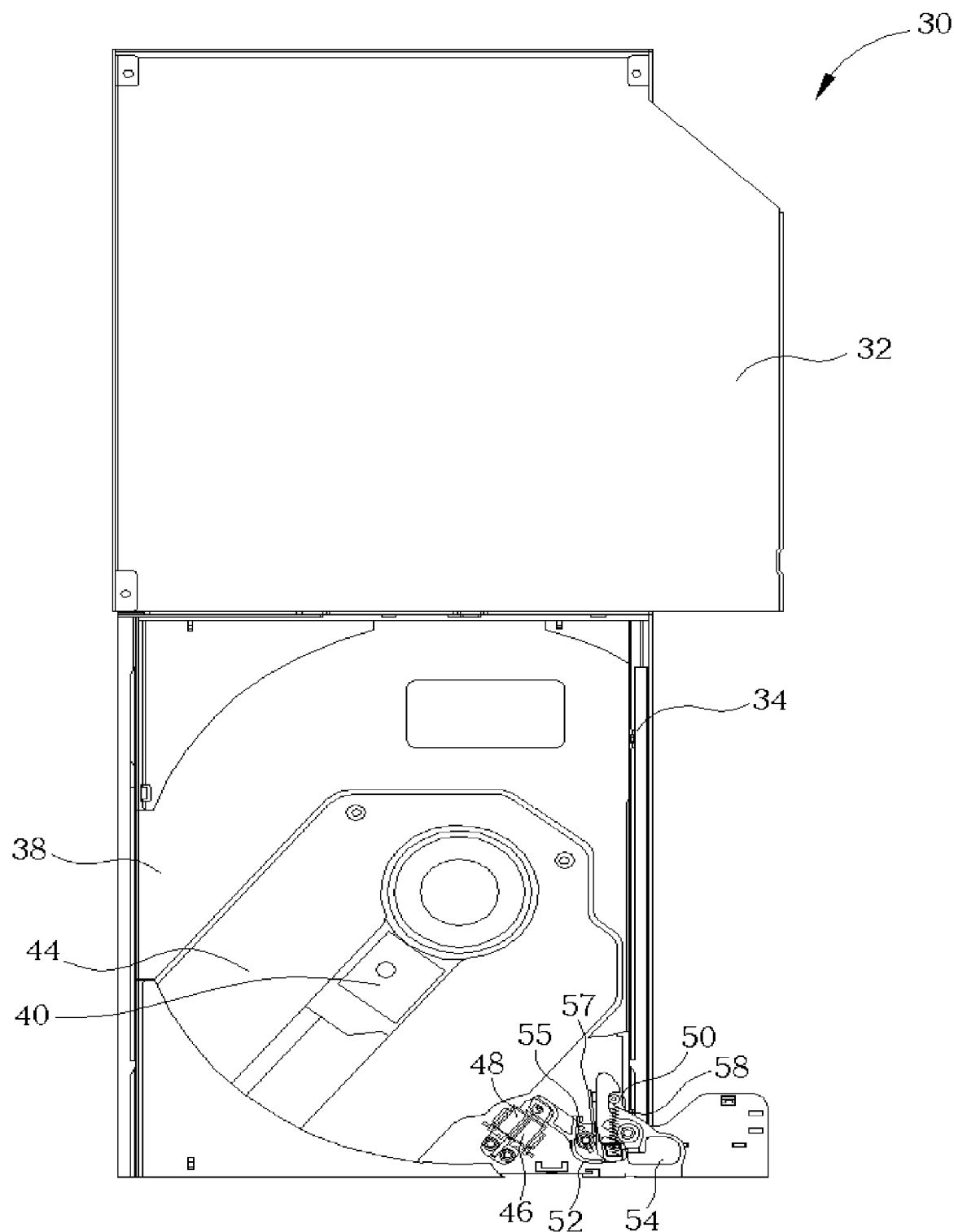
FIG. 8 is a location diagram of each component when the tray module of the optical disc drive in FIG. 6 is in the complete tray-out location.

Please refer to FIG. 6–FIG. 13. FIG. 6 is a schematic diagram of an optical disc drive with the tray module in the tray-in location according to the present invention. FIG. 7 is a schematic diagram of the optical disc drive in FIG. 6 when the tray module is in complete tray-out location. FIG. 8 is a location diagram of each component when the tray module of the optical disc drive in FIG. 6 is in the complete tray-out location.

Figure 9:
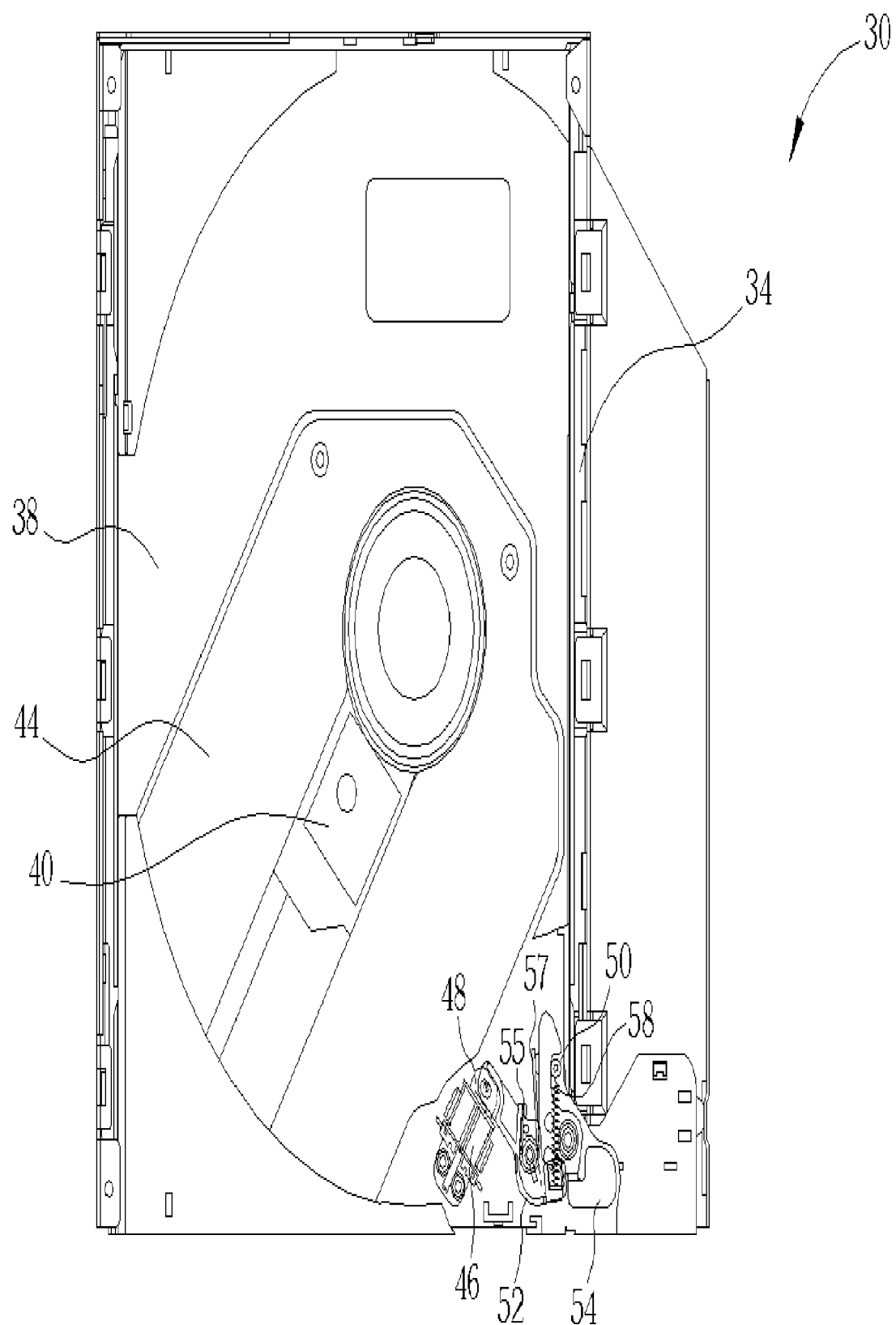
FIG. 9 is a schematic diagram of each component in the optical disc drive in FIG. 6.
Figure 10:
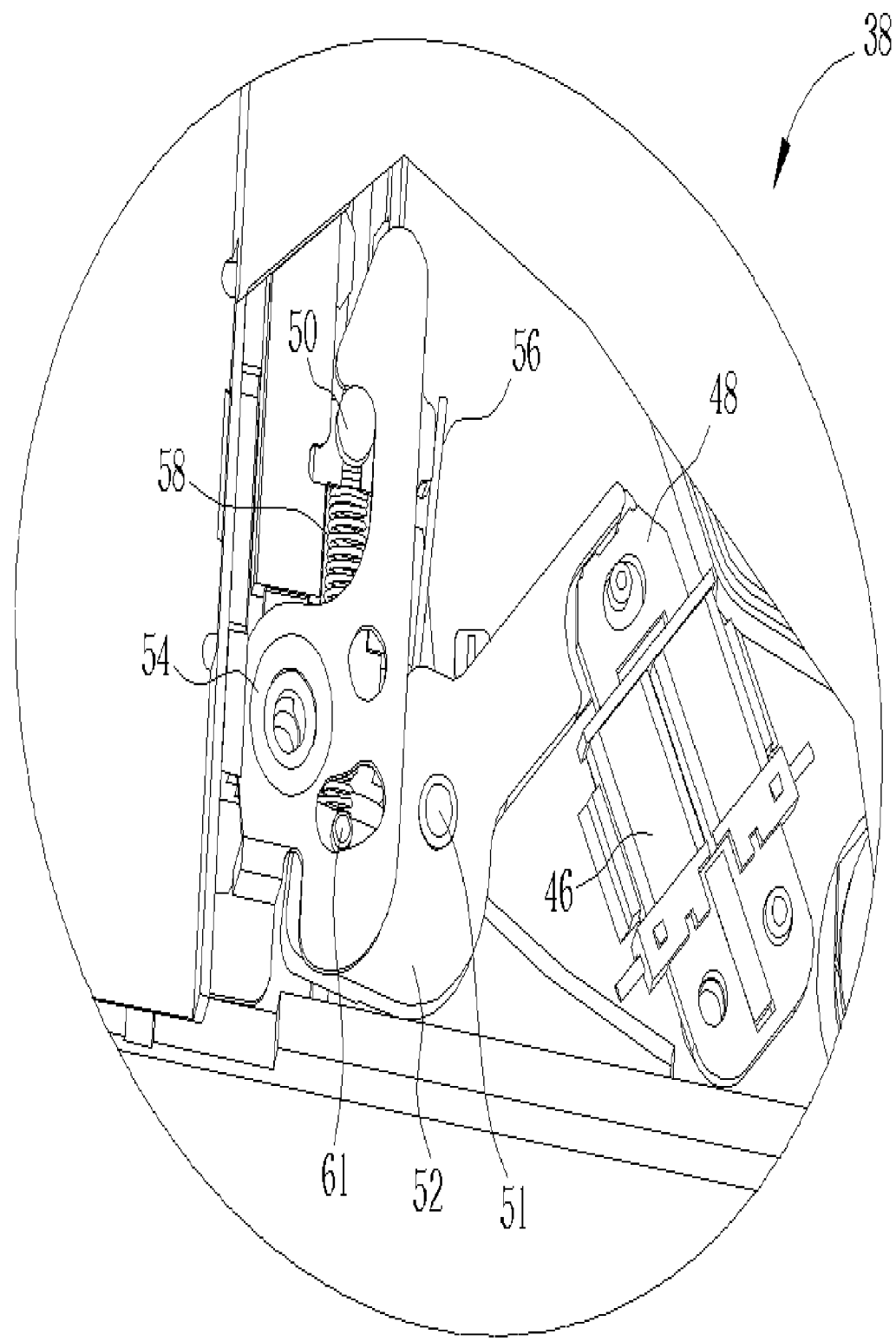
FIG. 10 is a reverse schematic diagram of the optical disc drive in FIG. 6 when the tray module is in the tray-in location.
Figure 11:
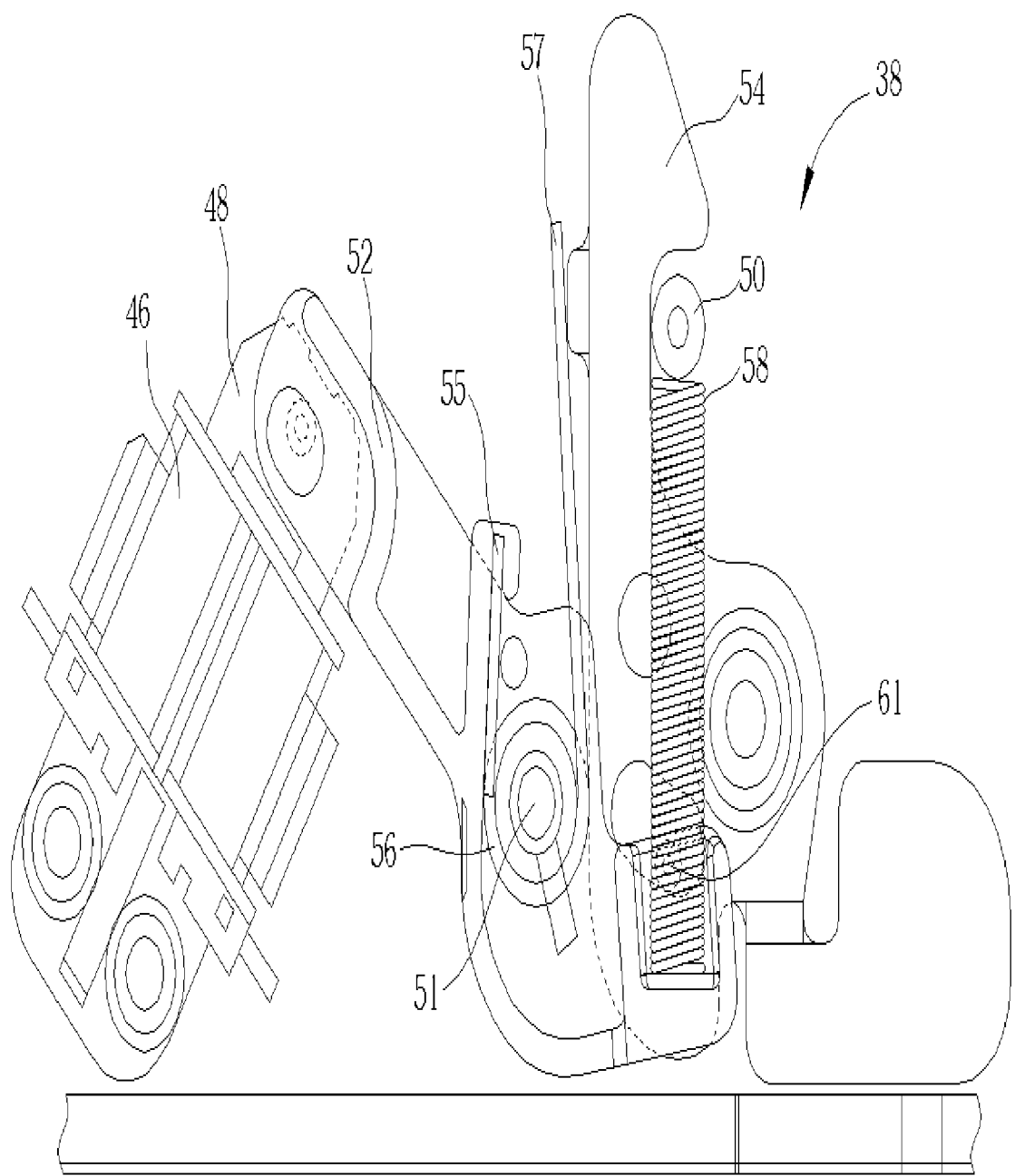
FIG. 11 is a front schematic diagram of some components when the tray module of the optical disc drive in FIG. 6 is in the tray-in location.
Figure 12:
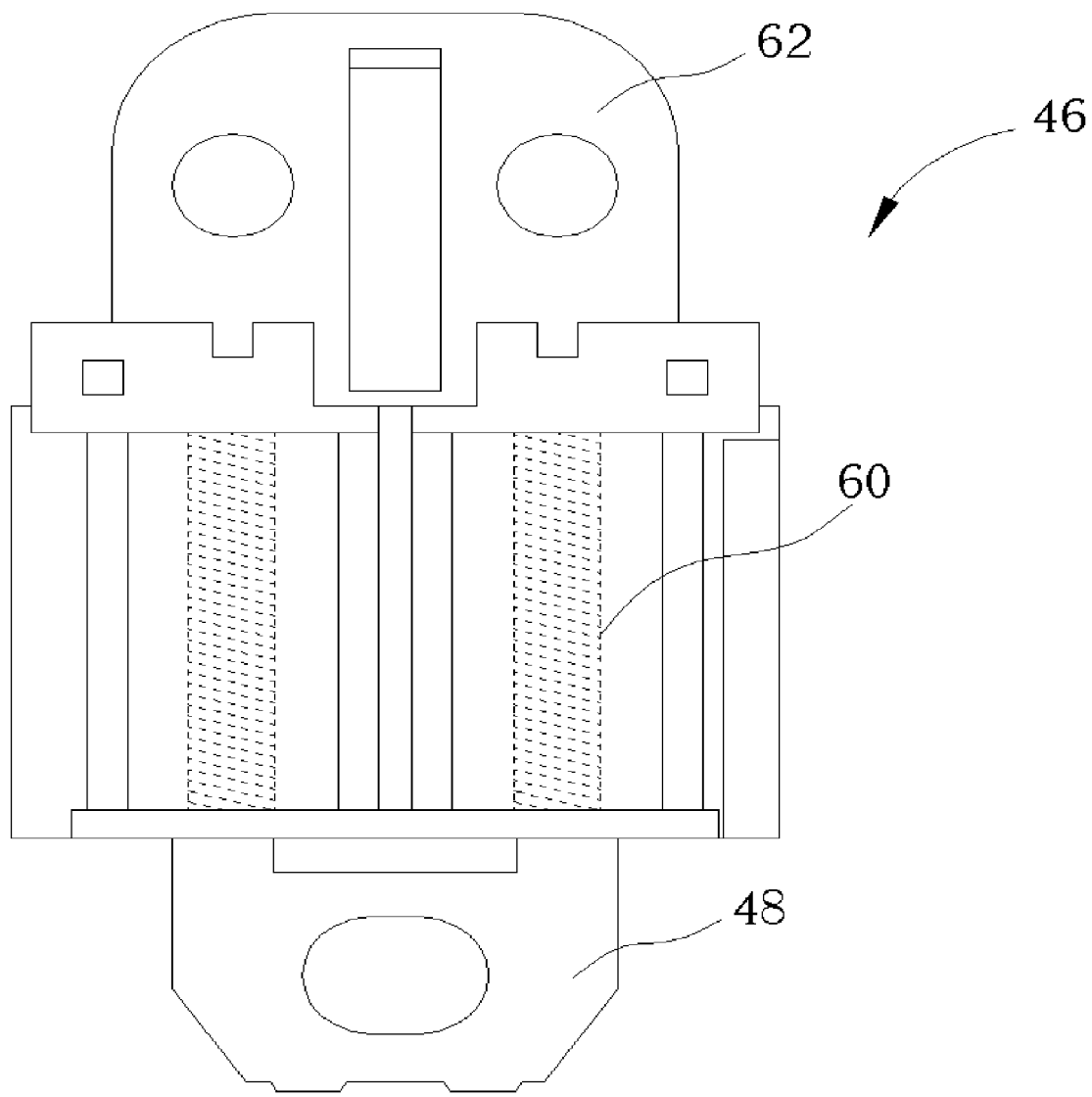
FIG. 12 is a schematic diagram of a solenoid and a latch in the optical disc drive in FIG. 6.
Figure 13:
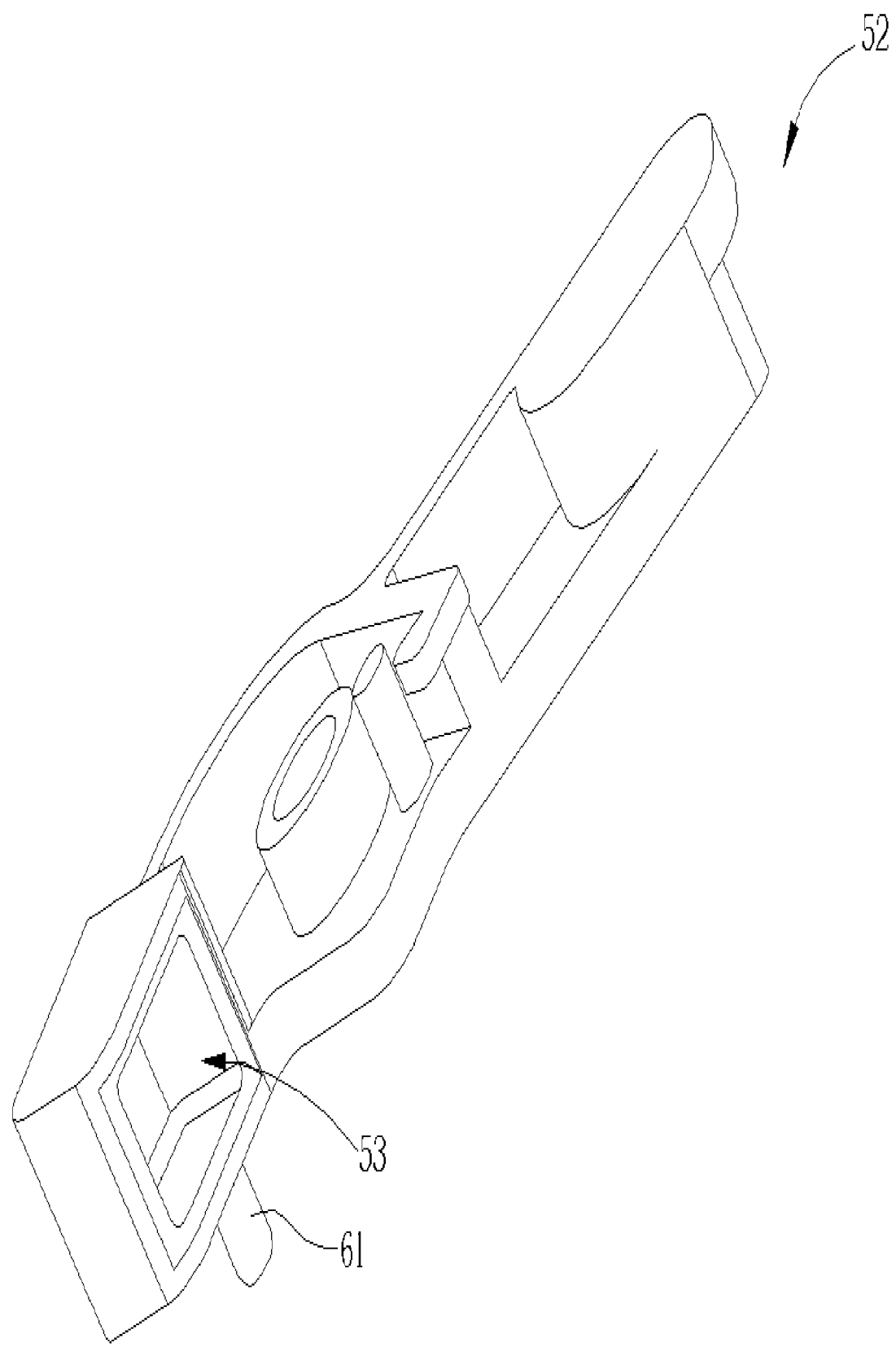
FIG. 13 is a schematic diagram of a push rod in the optical disc drive in FIG. 6.

FIG. 9 is a schematic diagram of each component in the optical disc drive in FIG. 6. FIG. 10 is a reverse schematic diagram of the optical disc drive in FIG. 6 when the tray module is in the tray-in location. FIG. 11 is a front schematic diagram of some components when a tray module of the optical disc drive in FIG. 6 is in the tray-in location. FIG. 12 is a schematic diagram of a solenoid and a latch in the optical disc drive in FIG. 6. FIG. 13 is a schematic diagram of a push rod in the optical disc drive in FIG. 6.

The optical disc drive 30 comprises a housing 32 having two tracks 34 and 36, a tray module 38 movably installed within the housing 32 along the two tracks 34 and 36. The tray module 38 comprises a read/write module 40 for reading and writing data in the optical disc, a tray 44 movably installed within the housing 32 along the tracks 34 and 36, a positioning shaft 50 fixed on the housing 32, a push rod 52 fixed in a rotatable manner on the tray 44 with respect to the pivot 51 with a first end of the push rod 52 connected to latch 48, a second end of the push rod 52 forming a slot 53 (it is shown in FIG. 13) and a third end of the push rod 52 comprising a protruding shaft 61, a hook 54 fixed in a rotatable manner on the tray 44 with a first end locked onto the positioning shaft 50 and a second end having a hole connected to the protruding shaft 61, a torsion spring 56 fixed on the pivot 51 of the push rod 52 with a first end 55 of the torsion spring 56 fixed on the push rod 52 and a second end 57 of the torsion spring 56 for pushing the hook 54, and a compression spring 58 installed on the tray 44 with one end fixed in the slot 53 of the push rod 52.

As shown in FIG. 9 and FIG. 11, the tray module 38 further comprises a solenoid 46 fixed on the tray 44 for providing magnetic force and a latch 48 installed beside the solenoid 46 moving in response to changes in the magnetic force. The solenoid 46 comprises a coil 60 and a magnet 62. When the coil 60 of the solenoid 46 is supplied with power, the coil 60 generates a magnetic force to counteract the magnetic force of the magnet 62. Countering the force from the magnet 62 frees the latch 48 allowing it to move in response to an external force. When the solenoid 46 is not supplied with power, the coil 60 does not generate a magnetic force to counteract the force from the magnet 62 meaning that the magnet 62 is capable of attracting the latch 48.

Please refer to FIG. 10 and FIG. 11. When the tray module 38 of the optical disc drive 30 is within the housing 32 and the coil 60 of the solenoid 46 is not supplied with power, the solenoid 46 can attract the latch 48. Attracting the latch 48 to the solenoid pulls the first end of the push rod 52 closer to the solenoid 46. This causes the second end 57 of the torsion spring 56 to first push the first end of the hook 54 away from the push rod 52 and then to lock the push rod 52 onto the positioning shaft, thereby counteracting the pushing force of compression spring 58 when the tray module 38 is within the housing 32.

Figure 14:
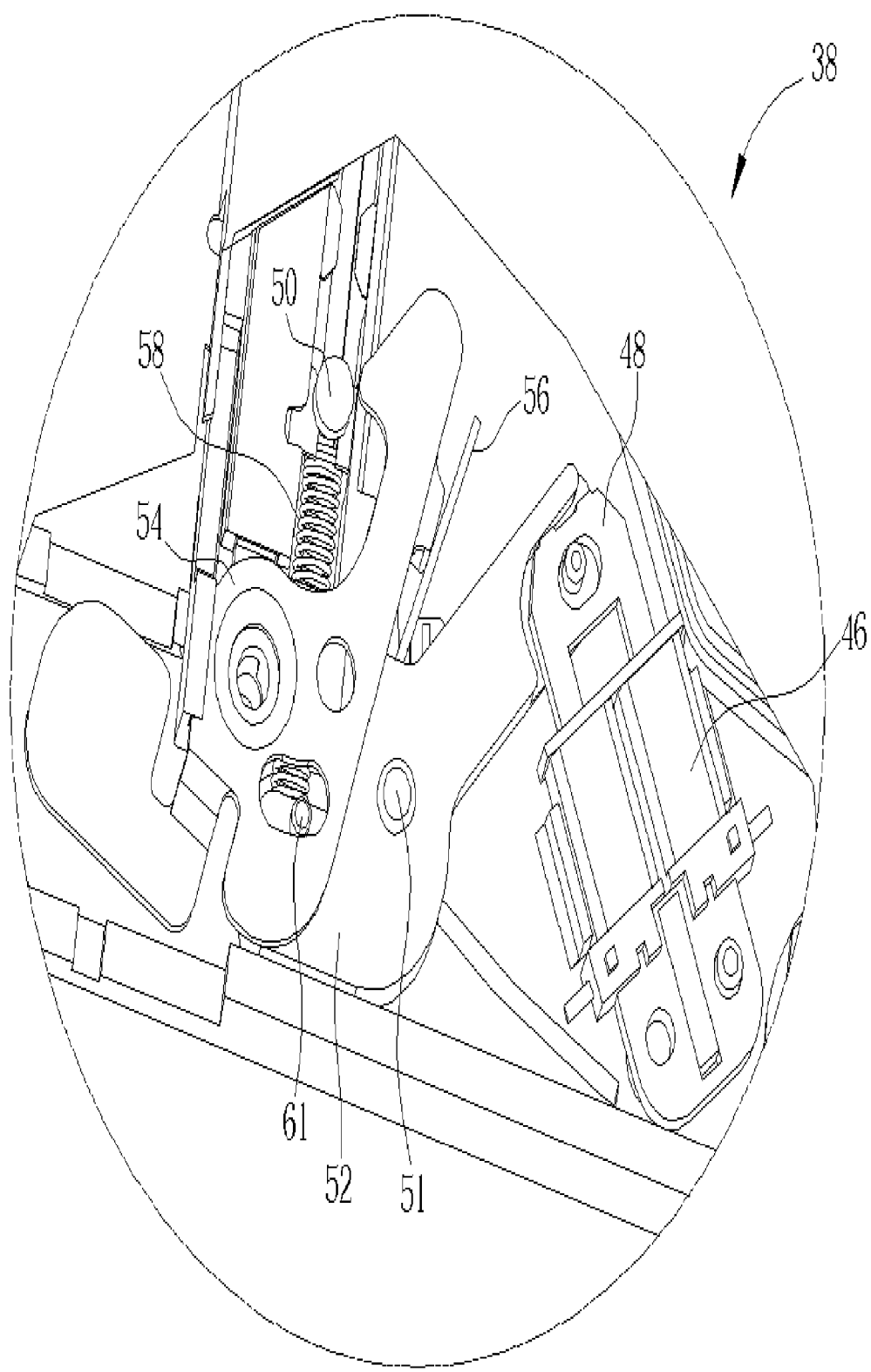
FIG. 14 is a reverse schematic diagram of some components at the time that the tray module of the optical disc drive in FIG. 6 is starting to be pushed out of the housing.
Figure 15:
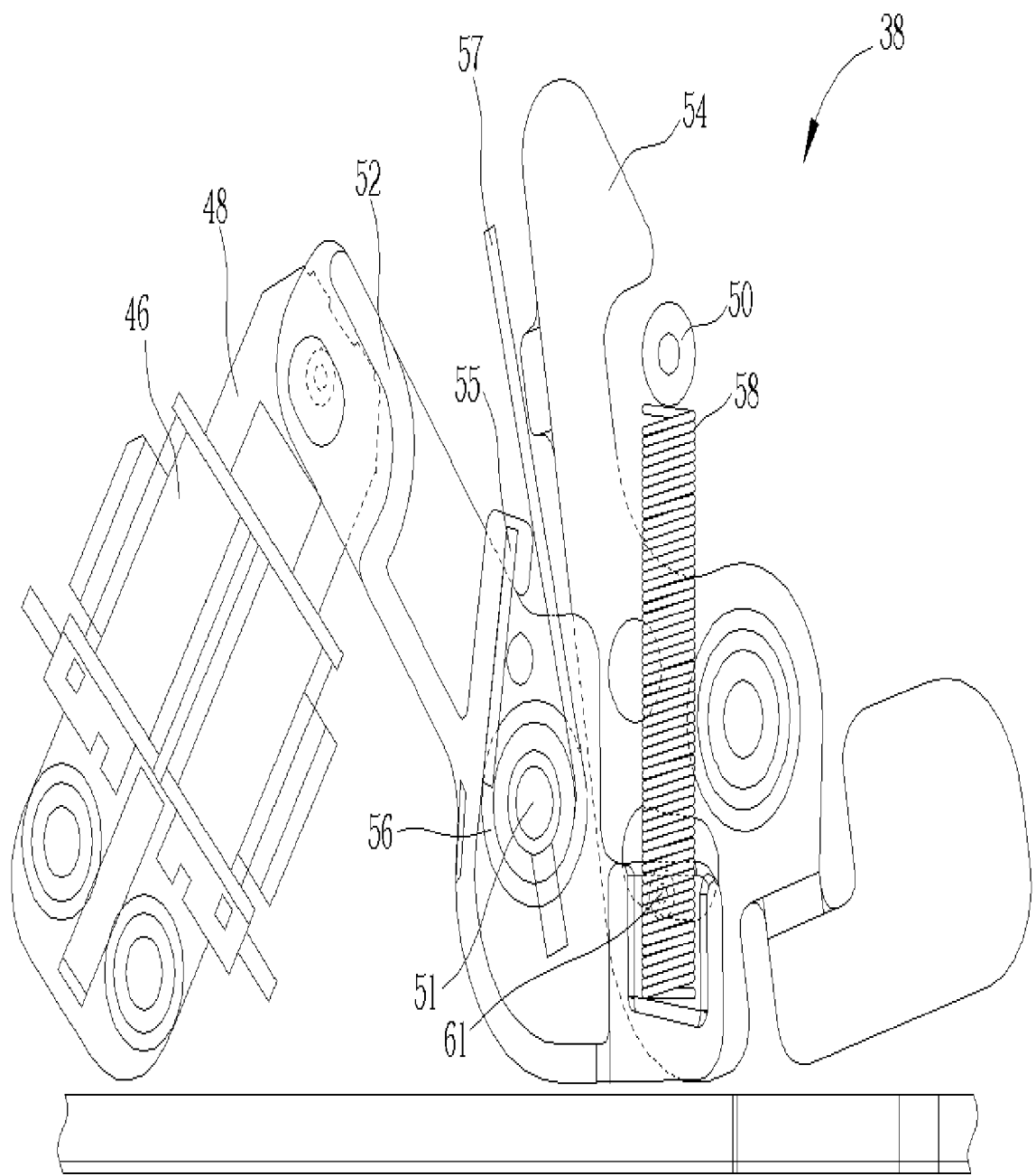
FIG. 15 is a front schematic diagram of some components at the time that the tray module of the optical disc drive in FIG. 6 is starting to be pushed out of the housing.

Please refer to FIG. 14 and FIG. 15. FIG. 14 is a reverse schematic diagram of some components at the time the tray module 38 of the optical disc drive 30 in FIG. 6 is starting to be pushed out of the housing 32. FIG. 15 is a front schematic diagram of some components at the time that the tray module of the optical disc drive 30 in FIG. 6 is starting to be pushed out of the housing 32. The tray-out operation of the tray module 38 is operated via pressing the key 39 on the panel of the optical disc drive 30. When the key 39 is pressed, the optical disc drive 30 sends a control signal to notify the CPU to send another control signal to supply the solenoid 46 with power. When the coil 60 of the solenoid 46 is supplied with power, the coil 60 generates a magnetic force to counteract the magnetic force of the magnet 62. As a result, the solenoid 46 does not attract the latch 48 allowing the compression spring 58 to push the push rod 52, which in turn makes the protruding shaft 61 push the hook 54. In response to the push, the first end of the hook 54 rotates away from the positioning shaft 50. At that moment, the compression spring 58 starts to push the tray 44 out of the housing 32.

Figure 16:
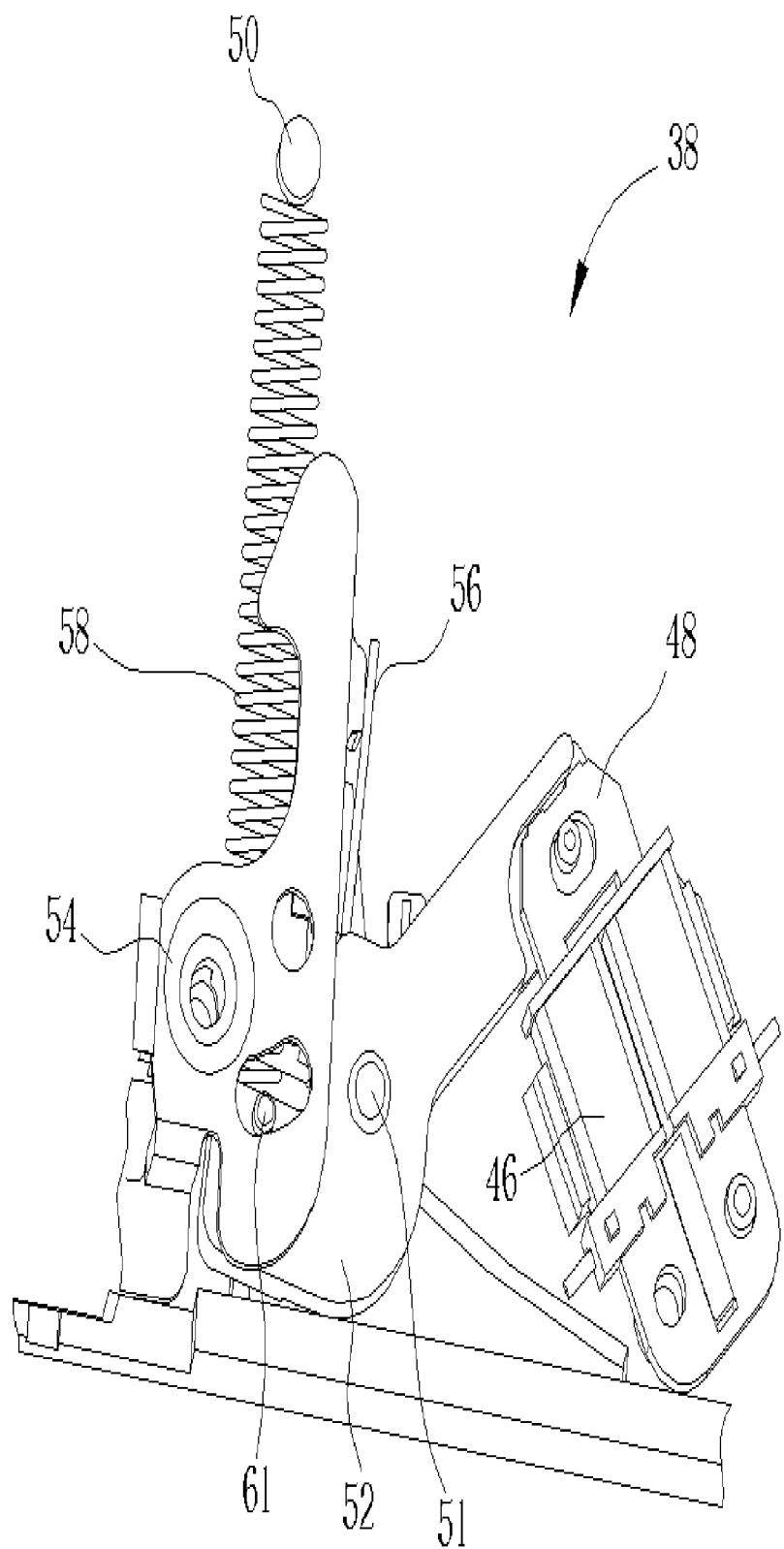
FIG. 16 is a reverse schematic diagram of some components when the tray module of the optical disc drive in FIG. 6 is in the complete tray-out location.
Figure 17:
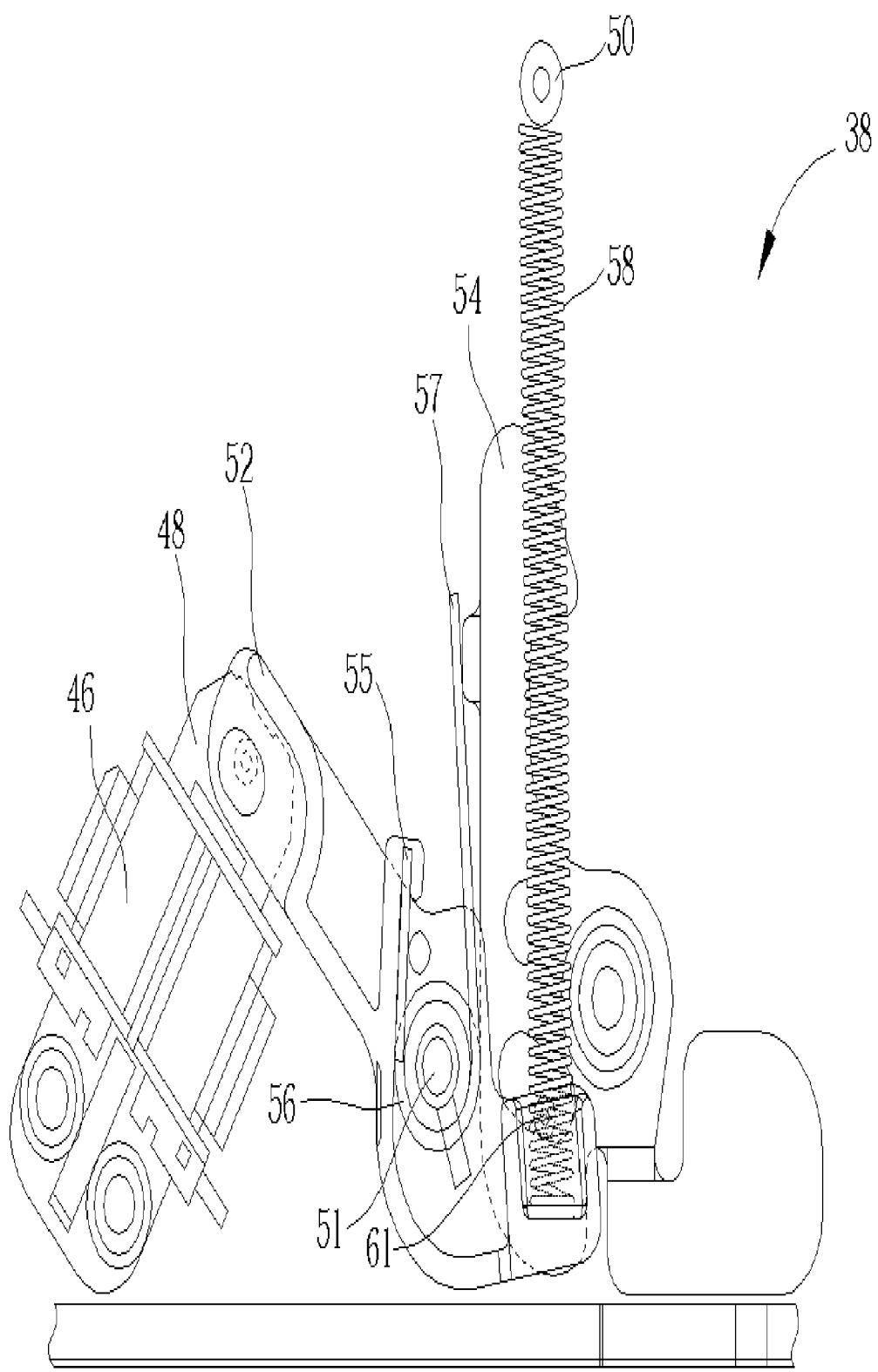
FIG. 17 is a front schematic diagram of some components when the tray module of the optical disc drive in FIG. 6 is in the complete tray-out location.

Please refer to FIG. 16 and FIG. 17. FIG. 16 is a reverse schematic diagram of some components when a tray module 38 of the optical disc drive 30 in FIG. 6 is in the complete tray-out location. FIG. 17 is a front schematic diagram of some components when a tray module 38 of the optical disc drive 30 in FIG. 6 is in the complete tray-out location. The charging-time period of the solenoid 46 is can be determined by the design demand of the optical disc drive 30. In the preferred embodiment, the time-period of supplying power is very short. When the solenoid 46 is supplied with power, the solenoid 46 generates a magnetic force to counteract the magnetic force of the magnet 62. As a result, the solenoid 46 does not attract the latch 48 allowing the compression spring 58 to push the push rod 52, which in turn makes the push rod rotate with respect to the pivot 51 by a small angle. At that moment, the protruding shaft 61 is links to the hook 54 causing the hook 54 to rotate by a small angle. As a result, the first end of the hook 54 departs from the positioning shaft 50, and the compressing spring 58 pushes the tray module 38 out of the housing 32. When the tray module 38 is pushed out of the housing 32 a little distance and the solenoid 46 is not supplied with power, the solenoid 46 attracts the latch 48 to fix the push rod 52. During this time, the protruding shaft 61 does not move the push the hook 54. The hook 54 is pushed by the second end 57 of the torsion spring 56 to the location shown in FIG. 15.

Please refer to FIG. 16 and FIG. 17 again. The moment the tray module 38 is out of the housing 32, the compression spring 58 pushes the tray module 38 until the tray module 38 is completely out of the housing 32, and then the compression spring 58 gradually returns to the original length. When the tray module 38 is in complete tray-out location, the compression spring 58 returns to the original length.

Figure 18:
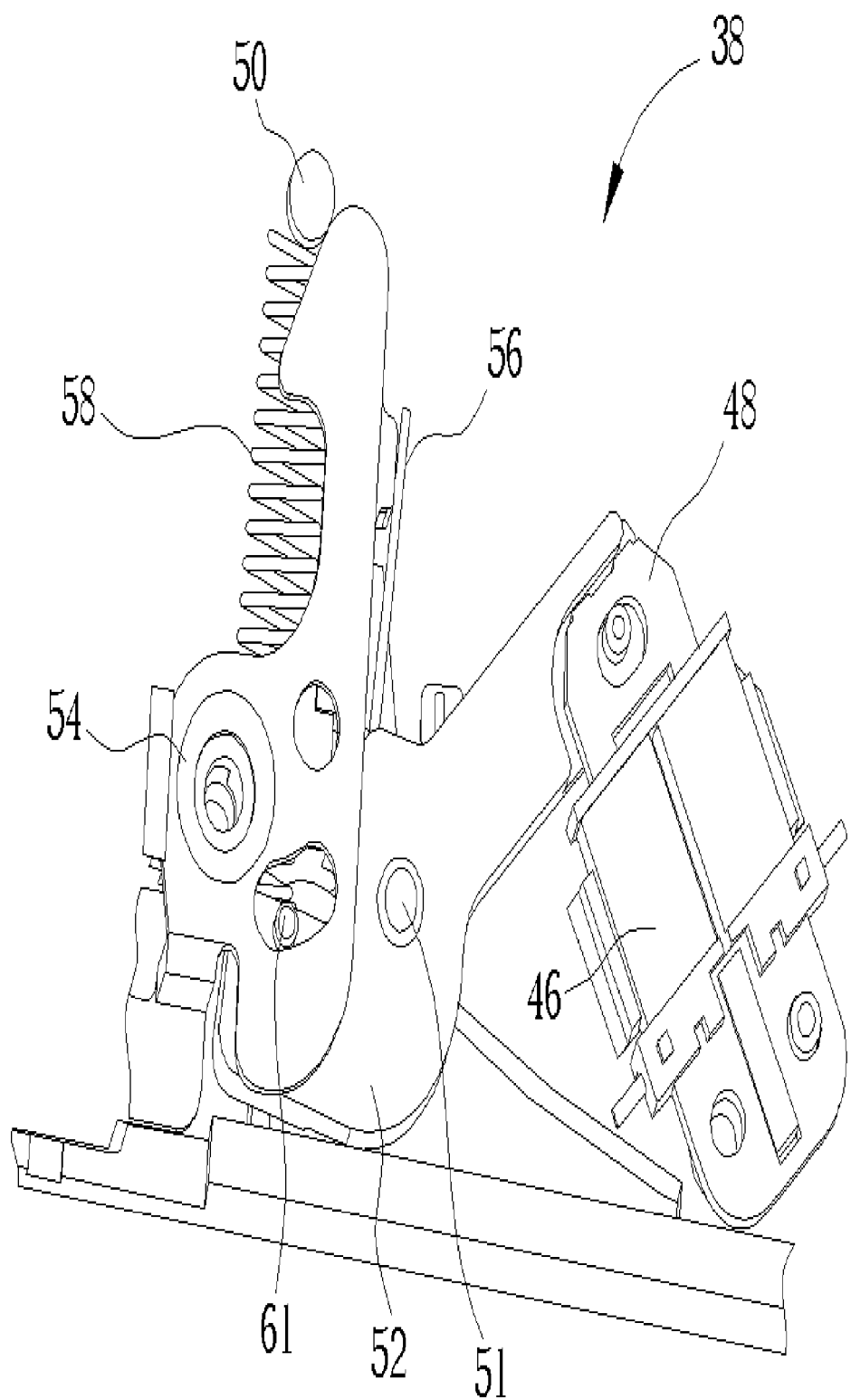
FIG. 18 is a reverse schematic diagram of some components when the tray module of the optical disc drive in FIG. 6 is pushed within the housing.
Figure 19:
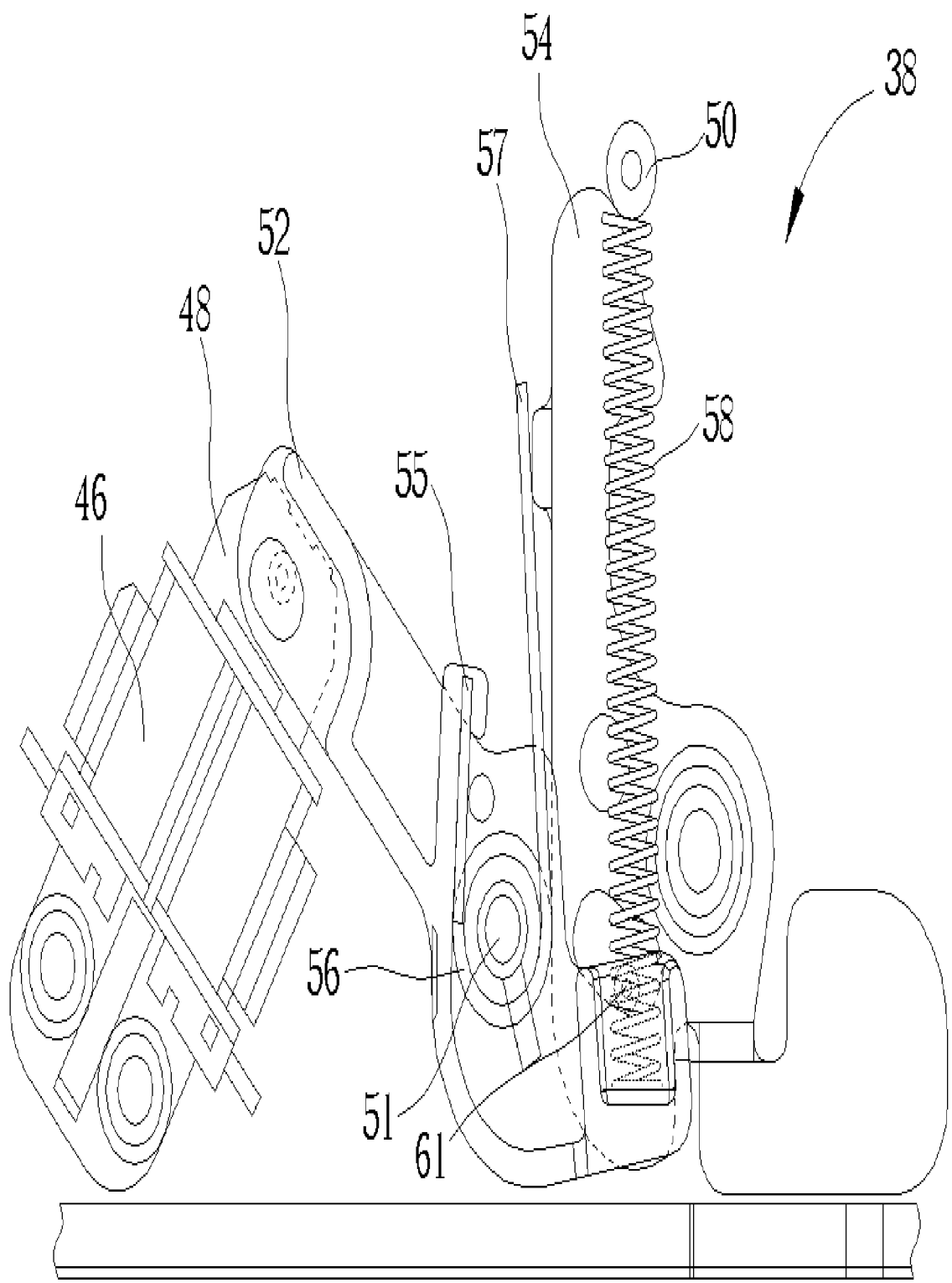
FIG. 19 is a front schematic diagram when the tray module of the optical disc drive in FIG. 6 is pushed within the housing.

Please refer to FIG. 16–FIG. 19. FIG. 18 is a reverse schematic diagram of some components when the tray module 38 of the optical disc drive 30 in FIG. 6 is pushed within the housing 32. FIG. 19 is a front schematic diagram of the optical disc drive 30 in FIG. 6 when the tray module 38 is pushed within the housing 32. When the tray module 38 is pushed within the housing 32 from the complete tray-out location and the solenoid 46 is not supplied with power, the solenoid 46 can attract the latch 48 to fix the push rod 50. When the tray module 38 is pushed into the housing 32 a little distance, the edge of the first end of the hook 54 is edging makes contact with the positioning shaft 50 (as shown in FIG. 18 and FIG. 19). When the tray module 38 is pushed within the housing 32, the hook 54 is pushed to rotate by a small angle until the first end of the hook 54 exceeds the positioning shaft 50 thereby locking the hook 54 onto the positioning shaft 50. The compressing spring 58 is compressed continuously until the tray module 38 is completely pushed within the housing 32. At this time, the compression spring has maximum elongation and continuously pushes the tray module 38.

Figure 20:
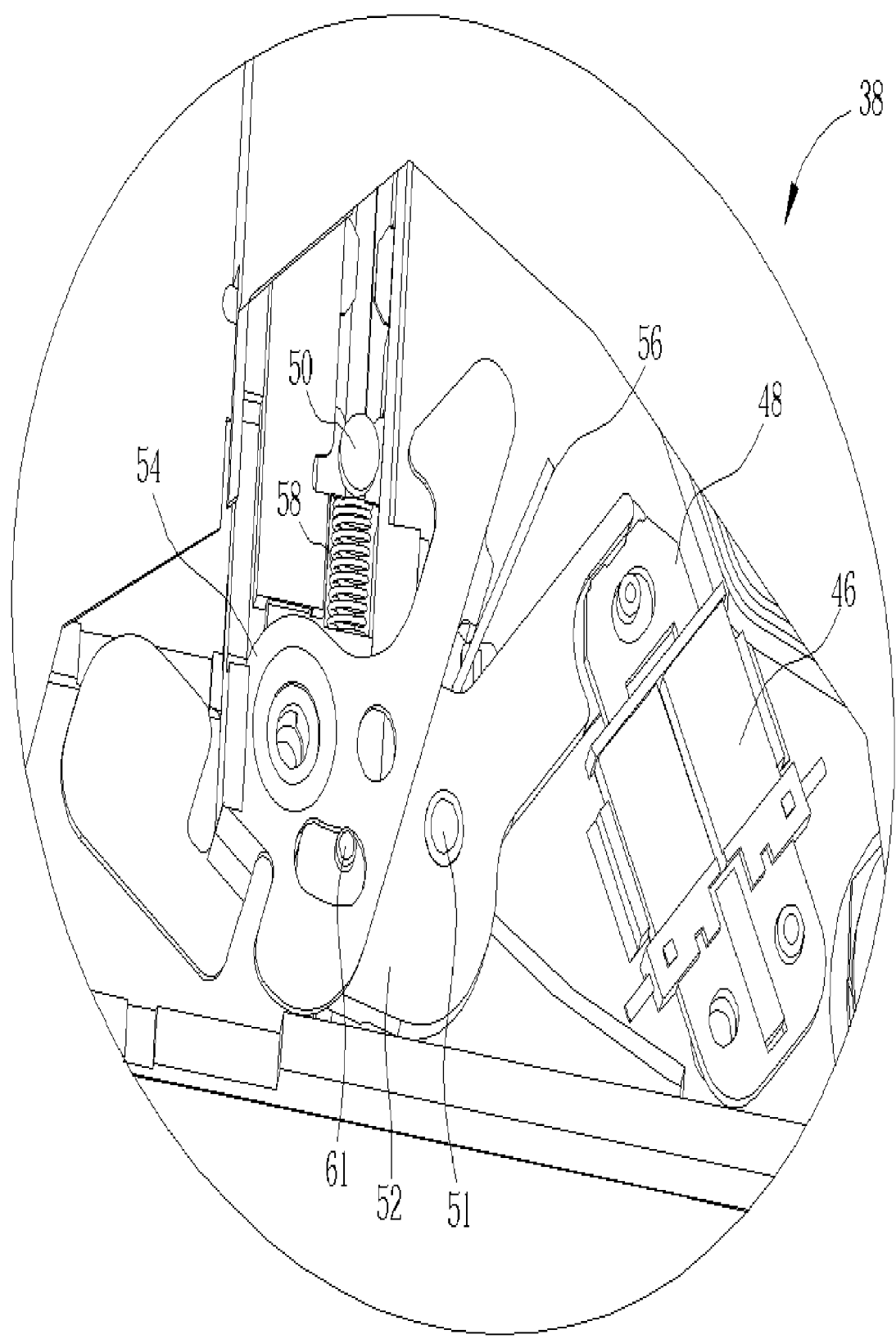
FIG. 20 is reverse schematic diagram of some components of the tray module of the optical disc drive in FIG. 6 when the tray module is in manual tray-out mode.
Figure 21:
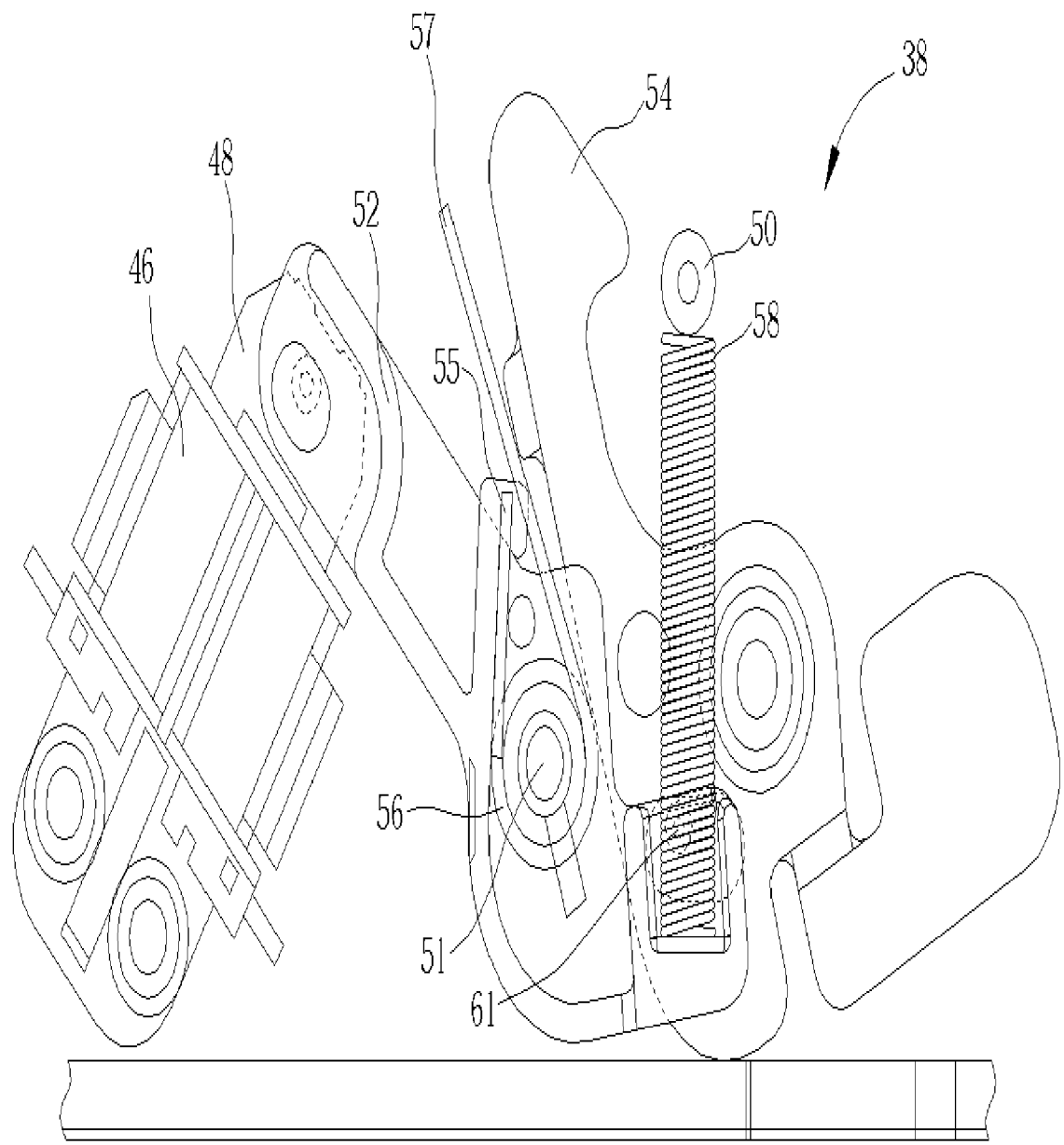
FIG. 21 is a front diagram of some components when the tray module of the optical disc drive in FIG. 6 is in the manual tray-out mode.

Please refer to FIG. 20 and FIG. 21. FIG. 20 is reverse schematic diagram of some components of the tray module 38 of the optical disc drive 30 in FIG. 6 when the tray module 38 of the optical disc drive 30 is in manual tray-out mode. FIG. 21 is a front diagram of some components when the tray module 38 of the optical disc drive 30 in FIG. 6 is in the manual tray-out mode. The manual tray-out operation of the tray module is operated via a hole 31(as displayed in FIG. 6). At the time the solenoid 46 is not supplied with power, the solenoid 46 attracts the latch 48 to fix the push rod 50. When a needle-shaped object moves the hook 54 via the hole 31, the hook 54 rotates by a small angle. The first end of the hook 54 departs from the positioning shaft 50, so the compression spring 58 pushes the tray module 38 out of the housing 32 15–25 mm.

Compared to the prior art, the character of the solenoid in the optical disc drive 30 in the invention along with a push rod, hook, and tray-out module is used to stably fix the tray module 38 of the optical disc drive 30 in the tray-in location and to solve the problem in the prior art of the tray module 14 not being stably fixed within the housing 12. Because the components in the invention are not highly dependent, the precisions of the components are not necessarily high. As a result, the assembling inaccuracy can be reduced so that the quality and the cost can be improved. The final result is the optical disc drive in the invention is a simple-mechanism with stable-operation and artistic-design.

Those skilled in the art will readily observe that numerous modifications and alterations of the device may be made while retaining the teachings of the invention. Accordingly, the above disclosure should be constructed as limited only by the metes and bounds of the appended claims.

The invention claimed is:

1. An optical disc drive comprising:
   a housing having at least a track
   a position shaft fixed on the housing; and
   a tray module comprising:
   a tray installed within the housing in a slidable manner along the track;
   a solenoid fixed on the tray for providing a magnetic force;
   a latch installed beside the solenoid for moving according to changes of the magnetic force;
   a push rod rotatably fixed on the tray with respect to a pivot, the push rod having one end connected to the latch and having a slot formed at another end;
   a hook rotatably fixed on the tray with one end for engaging with the positioning shaft and another end connected to the push rod;
   a torsion spring fixed on the pivot of the push rod; and
   a compression spring installed on the tray and having one end fixed in the slot of the push rod.

2. The optical disc drive of claim 1 wherein the solenoid comprises a magnet and a coil and the solenoid is capable of attracting the latch to make the first end of the push rod move close to the solenoid, and second end of the torsion spring push the first end of the hook away from the push rod; when the coil is supplied, the coil capable of generating the magnetic force to counteract the magnetic force of the magnetic to make the solenoid not attract the latch so that the compression spring is capable of moving the push rod, and then the push rod being of moving the first end of the rod to rotate away from the position shaft so that the compression spring pushes the tray away from the housing.

3. The optical disc drive of claim 1 wherein the first end of the push rod is connected to the latch in locking manner and the second end of the push rod is connected to the hook in the locking manner.

4. The optical disc drive of the claim 3 wherein the second end of the push rod has a protruding shaft connected to the hook in the locking manner.

5. The optical disc drive of claim 1 wherein the hook is an L-shaped hook and the first end of the hook has a tongue-shaped extension part for locking the position shaft.

* * * * *